United States Patent [19]

Vandling

[11] 4,130,840
[45] Dec. 19, 1978

[54] METHOD AND APPARATUS FOR COUPLING FACSIMILE SIGNALS TO A TELEPHONE NETWORK

[75] Inventor: John M. Vandling, Pleasantville, N.Y.

[73] Assignee: Exxon Research & Engineering Co., Florham Park, N.J.

[21] Appl. No.: 844,298

[22] Filed: Oct. 21, 1977

[51] Int. Cl.² ............................................. H04H 1/40
[52] U.S. Cl. .................................. 358/281; 358/284; 328/30; 178/66 R
[58] Field of Search ............... 358/280, 281, 284, 904; 325/30; 178/66 R

[56] References Cited

U.S. PATENT DOCUMENTS

| | | | |
|---|---|---|---|
| 3,824,498 | 7/1974 | McBride | 178/66 R |
| 3,920,897 | 11/1975 | Grant et al. | 178/66 R |
| 3,991,389 | 11/1976 | Dwire et al. | 325/30 |
| 4,003,002 | 1/1977 | Snijders et al. | 325/30 |

*Primary Examiner*—Robert L. Richardson
*Assistant Examiner*—Edward L. Coles
*Attorney, Agent, or Firm*—N. L. Norris

[57] ABSTRACT

A frequency modulated facsimile signal is synthesized from a high frequency signal having a frequency which varies in response to dark/light variations on a document. The higher frequency signal which comprises pulses is coupled to a synthesizing network which includes a digital-to-analog converter for producing synthesized frequency modulated facsimile signals. Enabling circuitry is associated with the digital-to-analog converter which assures that the frequency modulated facsimile signal will not terminate or begin except at axis crossing times.

15 Claims, 5 Drawing Figures

METHOD AND APPARATUS FOR COUPLING FACSIMILE SIGNALS TO A TELEPHONE NETWORK

BACKGROUND OF THE INVENTION

This invention relates to facsimile equipment and more particularly to the generation of frequency modulated facsimile signals representing dark/light variations or light/dark variations on a document.

Facsimile transmitters or transceivers having a transmitting capability frequency generate frequency modulated signals which are substantially sinusoidal in waveform. Typically, these sinusoidal signals vary in frequency from 1500 Hz. representing white to 2400 Hz. representing black with various intermediate frequencies representing shades of gray. It is common practice to generate the sinusoidal signals of utilizing a voltage controlled oscillator which produces an output of the desired frequency in response to voltages representing the dark/light variations as detected by a light sensitive device. The output from the voltage controlled oscillator which has a frequency equal to the frequency of the facsimile transmission signal is then filtered to remove high frequency components. This filtering is necessary to eliminate the high frequency components but undesirably decreases the speed of response of the transmitter to instantaneous dark/light variations so as to introduce phase distortion and delay. U.S. Pat. Nos. 3,911,207 and 4,015,077 assigned to the assignee of this invention, disclose facsimile equipment which generates facsimile signals in the above-described manner.

In general, it is desirable to transmit the dark/light transmission information over appropriate communication links, e.g., telephone lines, as rapidly as possible so as to maximize the use of the available bandwidth and provide optimum document resolution. This requires that the transmitting circuitry be capable of rapid changes in frequency representing a dark/light variation or light/dark variation. In other words, it is desirable that the frequency modulated facsimile signal be capable of a substantially instantaneous change in slope.

In the prior art, the facsimile signals have not been capable of the desired instantaneous change in frequency. Rather, the prior art has been characterized by a limited speed of response which can result in output signal phase distortion. Where the facsimile signal has been coupled to the network acoustically, the delays have not been that critical since acoustic coupling effectively limited the faithful reproduction of dark/light variations even if high frequency shift rates were achievable. However, with the advent of liberalized direct coupling for facsimile transceivers as disclosed in copending application Ser. No. 689,263 filed May 24, 1976, it becomes more important to assure that the speed of response is limited only by the unpredictable characteristics of the telephone network itself and not the facsimile transmission equipment.

The prior art includes techniques for synthesizing sinusoidal waveforms using digital techniques. In this connection, reference is made to an article entitled, "Create Sinewaves Using Digitalized IC's," Radio Electronics, November, 1976. As shown there, the output from the counters are summed to achieve a step-like sinusoidal waveform which is then smoothed by filtering.

SUMMARY OF THE INVENTION

It is an object of this invention to provide a method and apparatus for transmitting facsimile signals which is characterized by a high speed of response to frequency changes.

It is a closely related object of this invention to provide a method and apparatus for transmitting facsimile signals which reduce delays and phase distortion resulting from filtering.

It is a still further related object of this invention to provide a method and apparatus for transmitting facsimile signals which have a speed of response which is limited only by the bandwidth and other unpredictable characteristics of the telephone network such as phase jitter.

It is a still further object of this invention to provide a method and apparatus for transmitting facsimile signals which reduces any switching transients at signal turn on.

In accordance with these and other objects of the invention, a preferred embodiment of the invention comprises apparatus including sensor means for sensing dark and light regions on a document and transmitting means for generating frequency modulated transmission signals representing dark and light regions on a document. The transmitting means includes frequency modulating means for generating a higher frequency signal than the FM modulated transmission signal where the frequency of the higher frequency signal varies in response to the dark-light regions of the document. The transmitting means further comprises second means for generating the modulated transmission signals from the higher frequency signals such that a step type light-/dark or dark/light variation in scanned document information produces a change in frequency of the higher frequency signals thus producing a change in frequency of the transmission signal during a mere fraction of the transmission signal cycle.

The frequency modulating means may generate pulses, and the second means may comprise synthesizing means including a digital-to-analog converter means. The digital-to-analog converter may comprise counting means responsive to the pulses to store a count representing an accumulated number of pulses and decoding means responsive to the counting means for generating predetermined outputs corresponding to accumulated counts. The digital-to-analog converter means may further comprise a synthesizing network including a plurality of circuit elements coupled to the decoding means for selectively interconnecting the circuit elements to generate a transmission signal in response to predetermined outputs from the decoding means. Preferably, the counting means comprises an up/down counter.

In accordance with another important aspect of the invention, the digital-to-analog converter is reset to a count representing the nearest possible point to axis crossing of the sinewave transmission signal to reduce switching transients at signal turn-on time.

In the preferred embodiment of the invention, the facsimile transmitting apparatus is directly coupled to the telephone network without benefit of acoustic transducers. Isolation means are therefore provided between the transmitting apparatus and the telephone network.

In the preferred embodiment of the invention, filter means are provided at the output of the analog-to-digital converter for smoothing the synthesized frequency modulated transmission signal. However, the function performed by the filter is substantially limited to smoothing high frequency components which are present at the output of the digital-to-analog converter.

DETAILED DESCRIPTION OF A PREFERRED EMBODIMENT

Figure 1:
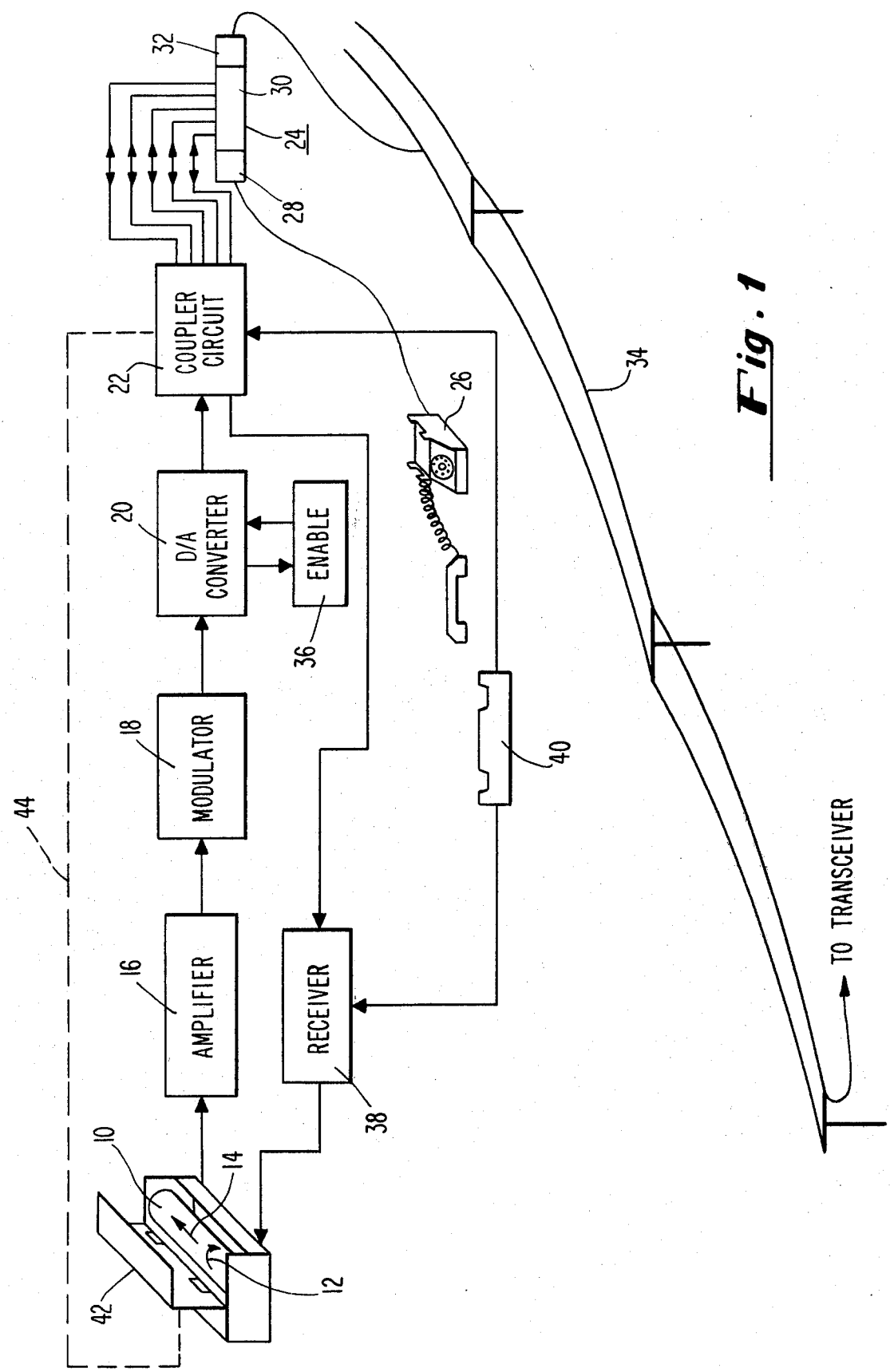
FIG. 1 is a schematic diagram in block form of a facsimile transceiver embodying the invention.

Referring to the system shown in FIG. 1, a facsimile transceiver comprises a drum 10 rotated by a motor not shown in the direction depicted by an arrow 12 so as to create a relative scanning movement between a document or copy medium carried by the drum 10 and a scanning head not shown. As the scanning head is advanced axially along the drum 10 as indicated by an arrow 14 and the drum rotates about its axis as indicated by the arrow 12, successive paths on the document or copy medium are placed in communication with suitable transducers carried by the head.

When the transceiver is operating in a transmit mode, the reading transducer such as a photodetector carried by the head detects variations in light intensity due to the reflectivity of the document as the document is scanned by the photodetector. The output from the photodetector is appropriately amplified at amplifier circuitry 16.

The output from the mudulator circuitry 16 is applied to FM modulator circuitry 18. In accordance with this invention, the modulation frequency is substantially higher than the frequency of the facsimile signals to be transmitted over the telephone network such that a change in frequency due to a step type dark/light variation at the document could occur in substantially less than the period of a cycle in the frequency modulated transmission signal. For example, the frequency of the output signal from the modulator circuitry 18 may be 18 times higher than the frequency of the transmission signals. In other words, a 1500 Hz. transmission frequency corresponding to white and a 2400 Hz. transmission frequency corresponding to black would be represented by 27,000 Hz. and 43,200 Hz. frequencies respectively.

Figure 3A:
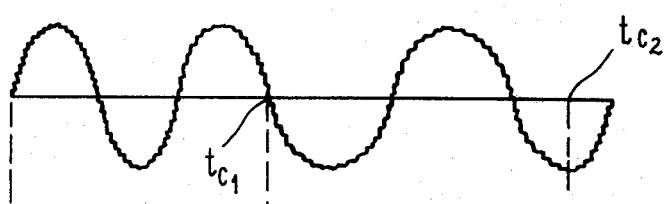
FIGS. 3a–c are waveforms of signals generated in the transceiver of FIGS. 1 and 2.
Figure 3B:
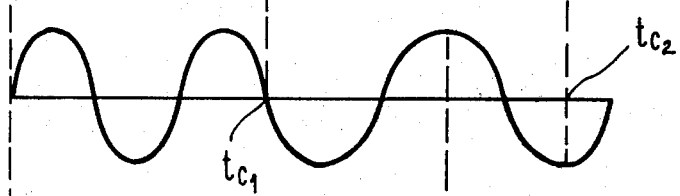

In order to generate the frequency modulated transmission signals of substantially lesser frequency than the outlet signal of the FM modulator 18 which may comprise a series of high frequency pulses as shown in FIG. 3a, synthesizing circuitry comprising a digital-to-analog converter 20 is utilized. The converter 20 synthesizes the FM transmission signal to provide a substantially sinusoidal waveform as shown in FIG. 3b before application to a coupler circuit 22. The output of the coupler circuit 22 is connected to a piggyback plug/jack arrangement 24 which provides a means of connecting a telephone set 26 to the telephone network. The telephone 26 is connected via a plug 28 to an interposed plug/jack combination 30 which is received by a jack 32 of the telephone network. Further details concerning the arrangement 24 are disclosed in copending application Ser. No. 689,263 filed May 24, 1976 which is incorporated herein by reference.

The facsimile signals as well as the voice signals may be transmitted to a receiving apparatus over the network which may include conventional telephone lines 19. It will be understood that any communication link including radio may be utilized.

In accordance with another important aspect of the invention, the digital-to-analog converter 20 and thus the output transmission signal is enabled or inhibited by means of an enable control circuit 36. The purpose of the enable control circuit 36 is to assure that FM transmission signals begin at or near axis crossing. Otherwise, transients may result which may be detrimental to tone decoding circuitry within the facsimile equipment.

The facsimile transceiver also includes a receiving capability. This capability is provided by a receiver circuit 38 which includes an FM demodulator. The receiver circuit 38 demodulates the transmitted FM signal from the coupler circuit 22 and applies this demodulated video signal to an appropriate writing means such as a stylus which may also be carried by the head so as to move in the direction indicated by the arrow 14.

In order to permit the use of the transceiver even in the absence of a jack 32, an acoustic coupler box 40 is provided. The coupler box 40 is connected to the coupler circuit 22 so as to permit the transmitted and received FM signals to be acoustically coupled to the telephone network.

The transceiver shown in FIG. 1 also includes means for selectively connecting the facsimile transceiver or the voice signals to the telephone network. In order to selectively connect the signals to the telephone network, a cover 42 associated with the drum 10 activates a switch so as to alternately connect the facsimile transmitting and receiving circuitry to the telephone network or the telephone set 26 to the telephone network. The broken line 44 which extends between the cover 42 and the coupler circuit 22 in FIG. 1 is intended to depict a mechanical linkage to the switch in the coupler circuit 22.

Figure 2:
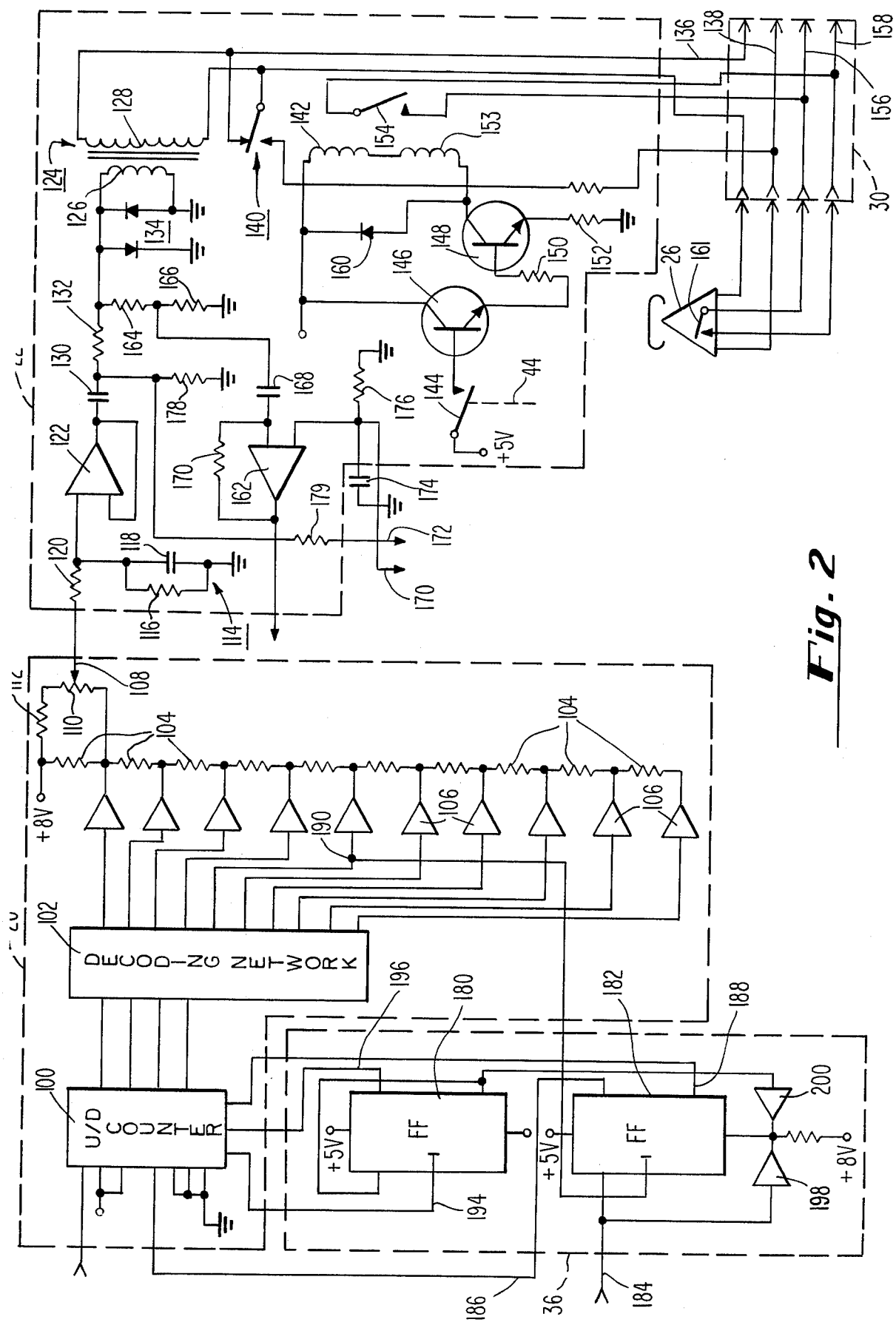
FIG. 2 is a more detailed schematic diagram of the facsimile transceiver of FIG. 1.

Reference will now be made to FIG. 2 for a more detailed description of the converter 20, the coupler 22 and the associated telephone set 26 which is shown in FIG. 1. The same circuitry may also be utilized at the remotely located transceiver referred to in FIG. 1.

Referring now to FIG. 2, the digital-to-analog converter 20 comprises an up/down counter 100 which is coupled to the output of the FM modulator 18 shown in FIG. 1. The pulses from the FM modulator 18 are applied serially to the counter 100 to produce binary parallel outputs which are applied to a decoding network 102. The outputs of the network 102 are coupled to a ladder synthesizing network including resistors 104 which are connected in series to a +8 volt power supply. As the various decoding outputs from the decoder 102 change state, different resistors 104, one at a time, are connected to ground through open collector outputs of decoder 102. Since the resistive values of the resistors 106 differ, the current flowing through a resistor 110 will vary as the decoding outputs change at a tap 108 of a potentiometer 110 which is connected to the +8 volt power supply through a resistor 112.

By the appropriate choice of the decoding network 102 and the resistors 104, the output at the tap 108 will be characterized by a waveform resembling a stepped sinusoid where the duration or width of the step substantially corresponds to the period of the higher frequency pulsed input to the up/down counter 100. Accordingly, a change in frequency of the pulsed input to the counter 100 will produce a change in step width of the sinusoidal sheet signal at the tap 108 which is a relatively short length of time as compared with the period of the sinusoidal waveform thus producing a high speed of response to dark/light variations in the document in accordance with this invention.

In order to remove the steps from the sinusoidal waveform, signal processing is performed by a smoothing filter 114 in the coupler circuit 22. The filter 114 comprises a series combination including a resistor 120 and a capacitor 118 which substantially remove the high frequency components from the sinusoidal waveform at the input to buffer amplifier 122 without introducing sinewave signal attenuation at the highest frequency of interest, e.g., 2400 Hz. In addition, the resistor 116 in combination with a resistor 120 assures an appropriate bias voltage at the input of the buffer amplifier 122. The buffered but unamplified sinusoidal waveform is then applied to an isolation network comprising a transformer 124 which includes a primary 126 and a secondary 128 connected directly to the telephone network. The output from the buffer amplifier 122 is coupled to the isolating transformer 124 through a capacitor 130 and a resistor 132. A parallel diode clamping network 134 is connected across the secondary 126 of the transformer 124.

In order to connect the frequency modulated facsimile signals to the tip lead 136 and the ring lead 138 of the telephone network, a relay 140 is first activated by a relay coil 142. As shown in FIG. 2, this is accomplished by closing a switch 144 which connects a +5 volt power supply so as to turn transistors 146 and 148 on. A base current limiting resistor 150 connects the emitter of the transistor 146 to the base of the transistor 148 while a resistor 152 connects the emitter of the transistor 148 to ground.

As shown in FIG. 2, a switch 144 is controlled by the mechanical linkage 44 to the cover 42. In this way, facsimile signals are automatically coupled to tip and ring of the telephone network whenever the cover 42 as shown in FIG. 1 is closed.

Closure of the cover 42 also creates current flow through a relay coil 153 which is connected in series with the coil 142 so as to close the relay 154. When the relay 154 is closed, lamp and/or annunciator leads 156 and 158 of associated telephone equipment are connected so as to light a lamp associated with the particular tip and ring leads 136 and 138 as will be found in a key telephone system. A flyback diode 160 is connected across the relay coils 142 and 153. In the alternative, a hook switch 161 associated with the telephone 26 may connect the leads 156 and 158 by simply taking the telephone off-hook.

When the transceiver is operating in the receiving mode, the transmitted FM facsimile signals are coupled to the coupler circuit through the transformer 124 and applied to an amplifier 162 through a capacitor 168 and a voltage divider network comprising resistors 164 and 166. These components also serve a high pass filter function and in combination with a feedback resistor 170 control the gain of the amplifier 162.

In order to permit the use of the transceiver with an acoustic coupler box where a suitable telephone jack is unavailable, the acoustic coupler box 40 may be connected at leads 170 and 172. The lead 170 is connected to the input of the amplifier 162 at the junction of a capacitor 174 and a resistor 176 connected to ground. The lead 172 is connected to the output of the amplifier 122 so as to connect the FM facsimile signal to the telephone network through the acoustic coupler via a resistor 179 which is connected to the junction of the capacitor 130, the resistor 132 and a resistor 178 connected to ground.

The enable circuit 36 comprises a pair of D-type flip-flops 180 and 182. When a low going enable signal is applied to an input lead 184, an output 186 of the flip-flop 182 is held low so as to enable the up/down counter 100. Simultaneously, output 188 which is connected to the counter 100 is held high. Should the input lead 184 go high, the counter 100 will continue to count and provide an output to the decoding network 102 until such time as an axis crossing of the sinusoidal waveform appears. Axis crossing is determined by applying an output 190 of the decoding network 102 to the clock input 192 of the flip-flop 182. When the output 190 of the decoding network 102 goes high at axis crossing time and the input 184 is high, the output 186 of the flip-flop 182 will go high so as to inhibit the counter 100 at axis crossing time.

The flip-flop 180 controls the direction of the count. Whenever the output 194 from the counter 100 which is coupled to the clock input of the flip-flop 180 goes high so as to indicate the maximum or minimum in the count of the up/down counter 100, the output 196 of the flip-flop 180 will change state so as to reverse the count in the counter 100. Noninverting gates 198 and 200 which are connected to the clear input of the flip-flop 182 serve to start the output signal at or near axis crossing and turn off the output signal at or near axis crossing. Since the closest approximation to an axis crossing does not occur during the down count but only during an up count, the output from the flip-flop 180 as applied through noninverting gate 200 is necessary to assure that the output signal will terminate at or near an axis crossing occuring during an up count.

It will therefore be understood that the enable circuit 36 assures that the count of the counter 100 continues up or down as long as an enable signal 184 is applied to the enabling circuit 36 and will only discontinue the count of the counter 100 at a time substantially coincident with axis crossing of the sinusoidal waveform at the output of the converter 20 even when the enable signal at the input 184 is no longer present. This assures that the sinusoidal waveform from the converter 20 will always end and begin at axis crossings since the counter 100 always begins at a count substantially corresponding to axis crossing thereby eliminating switching transients.

Figure 3C:
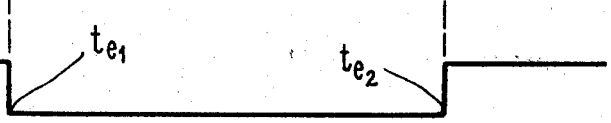

Reference will now be made to FIGS. 3a-c for a description of the various waveforms which are generated by the previously described circuitry. FIG. 3a illustrates the output from the converter 20 prior to application to the coupling circuit 22. It will be noted that the sinusoidal waveform includes steps where each step corresponds to a change from the output of the decoding network 102. FIG. 3b depicts the sinusoidal waveform after smoothing by the RC network 114 of the coupler circuit 22. Both FIGS. 3a and 3b depict a change in frequency at time $t_{c1}$ and $t_{c2}$ which produces a change in slope of the sinusoidal waveform at that moment of time. As clearly illustrated in FIGS. 3a and 3b, the change in frequency of the sinusoidal transmission signal occurs in a mere fraction of a cycle so as to provide a high speed of response to dark/light variations.

FIG. 3c depicts the enabling input 184 to the enable control circuit 36. It will be noted that the enabling signal changes from the high inhibit state to the low enable state at time $t_{e1}$ and from the low enable state to the high inhibit state at time $t_{e2}$. However, due to the nature of the enabling circuit 36, the converter 20 continues to generate the sinusoidal waveform until the first axis crossing after time $t_{e2}$ and during an up count thereby avoiding any high frequency transients which would occur if the sinusoidal waveform were allowed to jump from a given voltage to zero instantaneously.

Although a particular embodiment of the invention has been shown and described, it will be understood that various modifications will occur to those of ordinary skill in the art. For example, the ratio of the frequencies for the modulated signal and the transmission signal may vary, i.e., the ratio may be more or less than 18, and the invention embraces all such modifications which fall within the true spirit and scope of the invention as set forth in the appended claims.

What is claimed is:

1. A facsimile transmitting apparatus for transmitting signals representing dark and light regions on a document, said apparatus comprising:
   sensor means for sensing dark and light regions on the document; and
   transmitting means for generating frequency modulated transmission signals representing said dark and light regions on said document, the improvement comprising:
      signal generating means for generating a signal having a frequency substantially higher than the modulated transmission signal, the frequency of said higher frequency signal varying in response to said dark and light regions, and
      converter means for generating said transmission signal from said higher frequency signal such that a light/dark or dark/light variation between said regions produces a change in frequency of said higher frequency signal which in turn produces a change in frequency in said transmission signal in a fraction of the transmission signal cycle.

2. The facsimile transmitting apparatus of claim 1 comprising signal conditioning means coupled to the output of the converter means.

3. The facsimile transmitting apparatus of claim 1 comprising isolation means for coupling the converter means to the telephone network.

4. The facsimile transmitting apparatus of claim 1 including means for coupling voice communication means.

5. The facsimile transmitting apparatus of claim 1 wherein said converter means comprises:
   counting means responsive to the number of cycles of said higher frequency signal for storing a count corresponding thereto; and
   decoding means responsive to said counting means for generating predetermined outputs corresponding to the accumulated count.

6. The facsimile transmitting apparatus of claim 5 wherein said converter means further comprises a synthesizing network comprising a plurality of circuit elements, said synthesizing network being coupled to said decoding means for selectively interconnecting said circuit elements to generate said transmission signal in response to predetermined outputs from said decoding means.

7. The facsimile transmitting apparatus of claim 6 wherein said counting means comprises an up/down counter.

8. The facsimile transmitting apparatus of claim 5 including means enabling said counting means.

9. The facsimile transmitting apparatus of claim 8 wherein said enabling means only enables said counting means at predetermined counts.

10. The facsimile transmitting apparatus of claim 9 wherein said predetermined counts substantially corresponds to axis crossing of said transmission signal.

11. A facsimile transmitting apparatus for transmitting signals representing dark and light regions on a document, said apparatus comprising:
    sensor means for sensing dark and light regions on the document; and
    transmitting means for generating frequency modulated transmission signals representing said dark and light regions on said document, the improvement comprising:
       first means for generating a synthesizing signal having a frequency substantially higher than the modulated transmission signal, and
       second means for synthesizing said modulated transmission signal from said higher frequency synthesizing signal such that a light-dark variation between said regions produces a change in frequency of the transmission signal in a mere fraction of the transmission signal cycle.

12. The facsimile transmitting apparatus of claim 11 wherein the first means comprises pulse generating means.

13. The facsimile transmitting apparatus of claim 11 wherein the second means comprises digital-to-analog converter means.

14. The facsimile transmitting apparatus of claim 13 wherein the digital-to-analog converter means comprises:
    counting means responsive to the pulses to store a count representing an accumulated number of pulses; and
    decoding means responsive to the counting means for generating predetermined outputs corresponding to the accumulated counts.

15. The facsimile transmitting apparatus of claim 14 wherein the digital-to-analog converter means further comprises a synthesizing network comprising a plurality of circuit elements, the synthesizing network being coupled to the decoding means for selectively interconnecting the circuit elements to generate the transmission signal in response to predetermined outputs from the decoding means.

* * * * *